United States Patent
Cohen et al.

(10) Patent No.: US 7,438,079 B2
(45) Date of Patent: Oct. 21, 2008

(54) IN-LINE GAS PURITY MONITORING AND CONTROL SYSTEM

(75) Inventors: Joseph Perry Cohen, Bethlehem, PA (US); Frank Kenneth Schweighardt, Allentown, PA (US); David John Farese, Riegelsville, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 513 days.

(21) Appl. No.: 11/051,099

(22) Filed: Feb. 4, 2005

(65) Prior Publication Data

US 2006/0174941 A1  Aug. 10, 2006

(51) Int. Cl.
 *G05D 11/00* (2006.01)
(52) U.S. Cl. .................... 137/3; 137/88; 137/93; 73/31.03; 429/22
(58) Field of Classification Search ............... 137/3, 137/93, 88; 73/23.2, 31.03; 429/22, 34
 See application file for complete search history.

(56) References Cited

U.S. PATENT DOCUMENTS

| | | | |
|---|---|---|---|
| 4,847,783 A | 7/1989 | Grace et al. | |
| 4,907,441 A | 3/1990 | Shurmer | |
| 5,138,869 A | 8/1992 | Tom | |
| 5,321,146 A | 6/1994 | Royster, Jr. et al. | |
| 5,433,971 A | 7/1995 | Royster, Jr. et al. | |
| 6,451,464 B1 | 9/2002 | Edlund et al. | |
| 6,493,638 B1 | 12/2002 | McLean et al. | |
| 6,569,551 B2* | 5/2003 | Skala et al. | 429/17 |
| 2001/0032668 A1 | 10/2001 | Doty et al. | |
| 2002/0094310 A1* | 7/2002 | Krause et al. | 422/191 |
| 2002/0114984 A1* | 8/2002 | Edlund et al. | 429/19 |
| 2002/0155329 A1* | 10/2002 | Stevens | 429/17 |
| 2003/0077492 A1 | 4/2003 | Kuriiwa et al. | |
| 2004/0007180 A1 | 1/2004 | Yamasaki et al. | |
| 2004/0110048 A1* | 6/2004 | Hiramatsu et al. | 429/22 |

FOREIGN PATENT DOCUMENTS

| | | |
|---|---|---|
| DE | 198 15 256 C1 | 4/1999 |
| EP | 0 939 315 A1 | 12/1990 |

* cited by examiner

*Primary Examiner*—Kevin L Lee
(74) *Attorney, Agent, or Firm*—Keith D. Gourley

(57) ABSTRACT

Method for supplying a high purity gas product comprising providing a first gas stream including a major component and at least one impurity component, determining the concentration of the at least one impurity component, and comparing the concentration so determined with a reference concentration for that component. When the value of the concentration so determined is less than or equal to the reference concentration, the first gas stream is utilized to provide the high purity gas product. When the value of the concentration so determined is greater than the reference concentration, a second gas stream comprising the major component is provided and the first and second gas streams are mixed to yield a mixed gas stream having a concentration of the at least one impurity component that is less than the reference concentration. The mixed gas stream is utilized to provide the high purity gas product.

20 Claims, 3 Drawing Sheets

IN-LINE GAS PURITY MONITORING AND CONTROL SYSTEM

BACKGROUND OF THE INVENTION

A continuous supply of high purity feed gas is required in semiconductor manufacturing, analytical instrumentation, the operation of fuel cells, and other applications in which impurities in the feed gas can result in defective products, incorrect measurements, and damage to expensive equipment. For example, chemical vapor deposition processes are highly sensitive to small amounts of impurities in the feed gases used and are totally dependent on an uninterrupted supply of high purity feed gas. Many sensitive analytical instruments require a reliable supply of high purity reference or purge gases in order to generate reliable analyses. Fuel cells that operate on hydrogen can be irreversibly damaged by impurities such as hydrogen sulfide and carbon monoxide when present in the hydrogen feed gas.

High purity gases for such applications may be provided from various types of storage systems or alternatively may be generated immediately prior to use. The operation of storage systems may be susceptible to contamination, for example, when discharged tanks or cylinders are refilled from an external source or are replaced with full tanks or cylinders. The operation of high purity gas generating systems may be subject to operational upsets or contaminated feedstocks, which may introduce undesirable contaminants into the high purity gas product.

One approach to this problem is to shut down the gas-consuming process when impurities in the high purity or ultra-high purity feed gas are detected at a concentrations above allowable limits. This action reduces the potential for defective products and damage to sensitive equipment, but requires downtime to correct the problem and restart the process. Another approach is to provide a purification system or guard bed that operates continuously on the feed gas or is used to purify the feed gas stream only when contamination is detected in the feed gas.

It would be desirable to reduce the concentration of damaging contaminants in a high purity feed gas without interruption of the downstream process and without the need to purify the entire feed gas stream. The embodiments of the present invention address this need as disclosed in the following specification and defined by the claims that follow.

BRIEF SUMMARY OF THE INVENTION

An embodiment of the invention relates to a method for supplying a high purity gas product comprising providing a first gas stream containing a major component and at least one impurity component, determining the concentration of the at least one impurity component, and comparing the concentration so determined with a reference concentration for that component. When the value of the concentration so determined is less than or equal to the reference concentration, the first gas stream is utilized to provide the high purity gas product. When the value of the concentration so determined is greater than the reference concentration, a second gas stream comprising the major component is provided and the first and second gas streams are mixed to yield a mixed gas stream having a concentration of the at least one impurity component that is less than the reference concentration. The mixed gas stream is utilized to provide the high purity gas product.

The major component of the first gas stream may be hydrogen and the at least one impurity component may be selected from the group consisting of hydrogen sulfide; carbonyl sulfide; carbon monoxide; hydrocarbons having up to 5 carbon atoms; and compounds containing carbon atoms, hydrogen atoms, and one or more atoms selected from the group consisting of oxygen, nitrogen, and sulfur.

The first gas stream may be generated from a feed gas comprising one or more hydrocarbons having up to 5 carbon atoms by any of steam reforming, partial oxidation, and autothermal reforming. Alternatively, the hydrogen may be generated by the electrolysis of water.

The second gas stream may be provided from a storage system that stores the gas as a compressed gas, a cryogenic liquid, an adsorbed gas, or a chemically bound gas. The major component of the first gas stream and the second gas stream may be hydrogen. The storage system may store the gas as liquid hydrogen and the hydrogen in the second gas stream may be provided by vaporizing the liquid hydrogen.

The major component in the first and second gas streams may be hydrogen and either (1) the first gas stream may be provided by the electrolysis of water or the second gas stream may be provided by the electrolysis of water or (2) the first gas stream may be provided by the electrolysis of water and the second gas stream may be provided by the electrolysis of water.

In another embodiment, the second gas stream may be provided by dividing the first gas stream into a first substream and a second substream, removing at least a portion of the at least one impurity component in the first substream to provide a purified substream, and mixing the purified substream with the second substream to provide the high purity gas product. The major component of the first gas substream and the second gas substream may be hydrogen.

At least a portion of the at least one impurity component in the first gas substream may be removed therefrom by any method selected from the group consisting of permeation through a hydrogen-permeable membrane, pressure swing adsorption, thermal swing adsorption, and chemical reaction with a porous solid. The first gas stream may be generated from a feed gas comprising one or more hydrocarbons having up to five carbon atoms by any of steam reforming, partial oxidation, and autothermal reforming. Alternatively, the hydrogen in the first gas stream may be generated by the electrolysis of water.

The concentration of the at least one impurity component in the first gas stream may be determined by a sensor selected from the group consisting of field effect transistor (FET) sensors, microcantilever sensors, quartz-crystal sensors, electrolytic sensors, and chemiresistor sensors.

The high purity gas product may comprise hydrogen as the major component and the high purity gas product may be utilized as feed to a fuel cell.

An alternative embodiment of the invention relates to an apparatus for generating a high purity gas product comprising (a) a first flow control valve and piping means adapted to provide a first gas stream comprising a major component and at least one impurity component;

(b) a second control valve and piping means adapted to provide a second gas stream comprising the major component;

(c) a mixing zone having a first inlet, a second inlet, and an outlet, wherein the first inlet is in gas flow communication with the first flow control valve and piping means and the second inlet is in gas flow communication with the second control valve and piping means, and wherein the mixing zone is adapted to mix the first and second gas streams and provide a mixed gas stream via the outlet;

(d) an analysis zone having an inlet, an outlet, and at least one sensor adapted to measure the concentration of the at least one impurity component in the mixed gas stream and generate a first signal proportional to the concentration of the impurity component therein, wherein the inlet of the analysis zone is in gas flow communication with the outlet of the mixing zone and the outlet is adapted to provide the high purity gas product; and (e) control means adapted to receive the first signal, compare the first signal with a first parameter proportional to the concentration of the at least one impurity in the first gas stream and a second parameter proportional to a maximum allowable concentration of the at least one impurity in the high purity gas product, generate a second signal and a third signal, and transmit the second and third signals to the first and second flow control valves, respectively, such that the flow rates of the first and second gas streams can be adjusted to yield a concentration of the at least one impurity in the high purity gas product equal to or less than the maximum allowable concentration.

The first gas stream may comprise a plurality of impurity components and the analysis zone may comprise a plurality of sensors, wherein each sensor is adapted to determine the concentration of a different impurity component.

The apparatus may further comprise means for generating the first gas mixture from a feed gas comprising one or more hydrocarbons having up to 5 carbon atoms by any of steam reforming, partial oxidation, and autothermal reforming. Alternatively, the apparatus may further comprise either (1) means to provide the first gas stream by the electrolysis of water or means to provide the second gas stream by the electrolysis of water or (2) means to provide the first gas stream by the electrolysis of water and means to provide the second gas stream by the electrolysis of water.

The apparatus may further comprise purifier means adapted for the removal of the at least one impurity from the first gas mixture, wherein the purifier means has an inlet and an outlet, piping means adapted to transfer a portion of the first gas mixture to the inlet of the purifier means, and piping means adapted to transfer a purified gas mixture from the outlet of the purifier to the second control valve. The purifier means may comprise a system selected from the group consisting of permeation through a hydrogen-permeable membrane, pressure swing adsorption, thermal swing adsorption, and chemical reaction with a porous solid.

A related embodiment of the invention includes a method for generating a high purity gas product comprising (a) providing an apparatus comprising
   (1) a first flow control valve and piping means adapted to provide a first gas stream comprising a major component and at least one impurity component;
   (2) a second control valve and piping means adapted to provide a second gas stream comprising the major component;
   (3) a mixing zone having a first inlet, a second inlet, and an outlet, wherein the first inlet is in gas flow communication with the first flow control valve and piping means and the second inlet is in gas flow communication with the second control valve and piping means, and wherein the mixing zone is adapted to mix the first and second gas streams and provide a mixed gas stream via the outlet;
   (4) an analysis zone having an inlet, an outlet, and at least one sensor adapted to measure the concentration of the at least one impurity component in the mixed gas stream and generate a first signal proportional to the concentration of the impurity component therein, wherein the inlet of the analysis zone is in gas flow communication with the outlet of the mixing zone and the outlet is adapted to provide the high purity gas product; and
   (5) control means adapted to receive the first signal, compare the first signal with a first parameter proportional to the concentration of the at least one impurity in the first gas stream and a second parameter proportional to a maximum allowable concentration of the at least one impurity in the high purity gas product, generate a second signal and a third signal, and transmit the second and third signals to the first and second flow control valves, respectively;

(b) providing the first gas stream comprising the major component and the at least one impurity component;

(c) determining the concentration of the at least one impurity component, in the mixed gas stream, generating the first signal proportional to the concentration of the impurity component therein, and comparing the first signal so generated with the first and second parameters;

(d) when the value of the first signal so determined is less than or equal to second parameter, generating the second and third signals which open the first control valve and close the second control valve, respectively, such that the first gas stream provides the high purity gas product; and (e) when the value of the concentration so determined is greater than the second parameter,
   (1) generating the second and third signals,
   (2) providing the second gas stream comprising the major component,
   (3) utilizing the second and third signals to control the first and second flow control valves, respectively, such that the signal proportional to the concentration of the at least one impurity component in the mixed gas stream is less than the second parameter, and
   (4) utilizing the mixed gas stream to provide the high purity gas product.

The first gas stream may comprise a plurality of impurity components and the analysis zone may comprise a plurality of sensors, wherein each sensor is adapted to determine the concentration of a different impurity component. The method may further comprise generating the first gas mixture from a feed gas comprising one or more hydrocarbons having up to 5 carbon atoms by any of steam reforming, partial oxidation, and autothermal reforming. Alternatively, the first gas stream may comprise hydrogen generated by the electrolysis of water.

The method may further comprise (f) providing purifier means adapted for the removal of the at least one impurity from the first gas mixture, wherein the purifier means has an inlet and an outlet, piping means adapted to transfer a portion of the first gas mixture to the inlet of the purifier means, and piping means adapted to transfer a purified gas mixture from the outlet of the purifier to the second control valve; and (g) removing at least a portion of the at least one impurity from the first gas mixture to provide the purified gas mixture and transferring the first gas mixture to the second control valve, The purifier means may comprise a system selected from the group consisting of permeation through a hydrogen-permeable membrane, pressure swing adsorption, thermal swing adsorption, and chemical reaction with a porous solid.

Another related embodiment of the invention includes a method for supplying a high purity gas product comprising
(a) providing a first gas stream comprising a major component and at a plurality of impurity components;

(b) determining the concentration of each of the impurity components and summing the concentrations so determined to yield a total impurity concentration, and comparing the total impurity concentration with a reference total impurity concentration;

(c) when the value of the total impurity concentration is less than or equal to the reference total impurity concentration, utilizing the first gas stream to provide the high purity gas product; and (d) when the value of the total impurity concentration is greater than the reference total impurity concentration,
(1) providing a second gas stream comprising the major component, and
(2) mixing the first gas stream with the second gas stream to yield a mixed gas stream having a total impurity concentration that is less than the reference total impurity concentration, and utilizing the mixed gas stream to provide the high purity gas product.

An alternative embodiment of the invention relates to an apparatus for generating a high purity gas product comprising (a) a proportional flow control and mixing valve having a first inlet adapted to accept a first gas stream comprising a major component and at least one impurity component, a second inlet adapted to accept a second gas stream comprising the major component, and an outlet adapted to supply a mixed gas stream;

(b) an analysis zone having an inlet, an outlet, and at least one sensor adapted to measure the concentration of the at least one impurity component in the mixed gas stream and generate a first signal proportional to the concentration of the impurity component therein, wherein the inlet of the analysis zone is in gas flow communication with outlet of the proportional flow control and mixing valve and is adapted to provide the high purity gas product; and (c) control means adapted to receive the first signal, compare the first signal with a first parameter proportional to the concentration of the at least one impurity in the first gas stream and a second parameter proportional to a maximum allowable concentration of the at least one impurity in the high purity gas product, generate a second signal proportional to the ratio of the first and second parameters, and transmit the second signal to the proportional flow control and mixing valve such that the flow rates of the first and second gas streams can be adjusted to yield a concentration of the at least one impurity in the high purity gas product equal to or less than the maximum allowable concentration.

The first gas stream may comprise a plurality of impurity components and the analysis zone may comprise a plurality of sensors, wherein each sensor is adapted to determine the concentration of a different impurity component.

The apparatus may further comprise means for generating the first gas mixture from a feed gas containing one or more hydrocarbons having up to five carbon atoms by any of steam reforming, partial oxidation, and autothermal reforming. Alternatively, the apparatus may further comprise either (1) means to provide the first gas stream by the electrolysis of water or means to provide the second gas stream by the electrolysis of water or (2) means to provide the first gas stream by the electrolysis of water and means to provide the second gas stream by the electrolysis of water.

The apparatus may further comprise purifier means adapted for the removal of the at least one impurity from the first gas mixture, wherein the purifier means has an inlet and an outlet, piping means adapted to transfer a portion of the first gas mixture to the inlet of the purifier means, and piping means adapted to transfer a purified gas mixture from the outlet of the purifier to second inlet of the proportional flow control and mixing valve. The purifier means may comprise a system selected from the group consisting of permeation through a hydrogen-permeable membrane, pressure swing adsorption, thermal swing adsorption, and chemical reaction with a porous solid.

DETAILED DESCRIPTION OF THE INVENTION

Embodiments of the invention disclosed herein comprise systems and methods for continuously supplying a high purity gas product to a downstream gas consuming process. A primary gas supply normally provides the high purity gas product at or below maximum allowable impurity levels; in the event of an increase in the impurity levels in the primary gas supply, the primary gas is blended with a second gas of higher purity to dilute the primary gas and form a gas mixture that meets the purity specifications for the high purity gas product. An in-line sensor monitors the purity of the high purity gas product and a flow control system controls the primary gas and secondary gas flow rates such that the gas product is provided at or below the maximum allowable impurity levels. Embodiments of the invention may be used, for example, to provide high purity hydrogen feed to a hydrogen fuel cell system.

Figure 1:
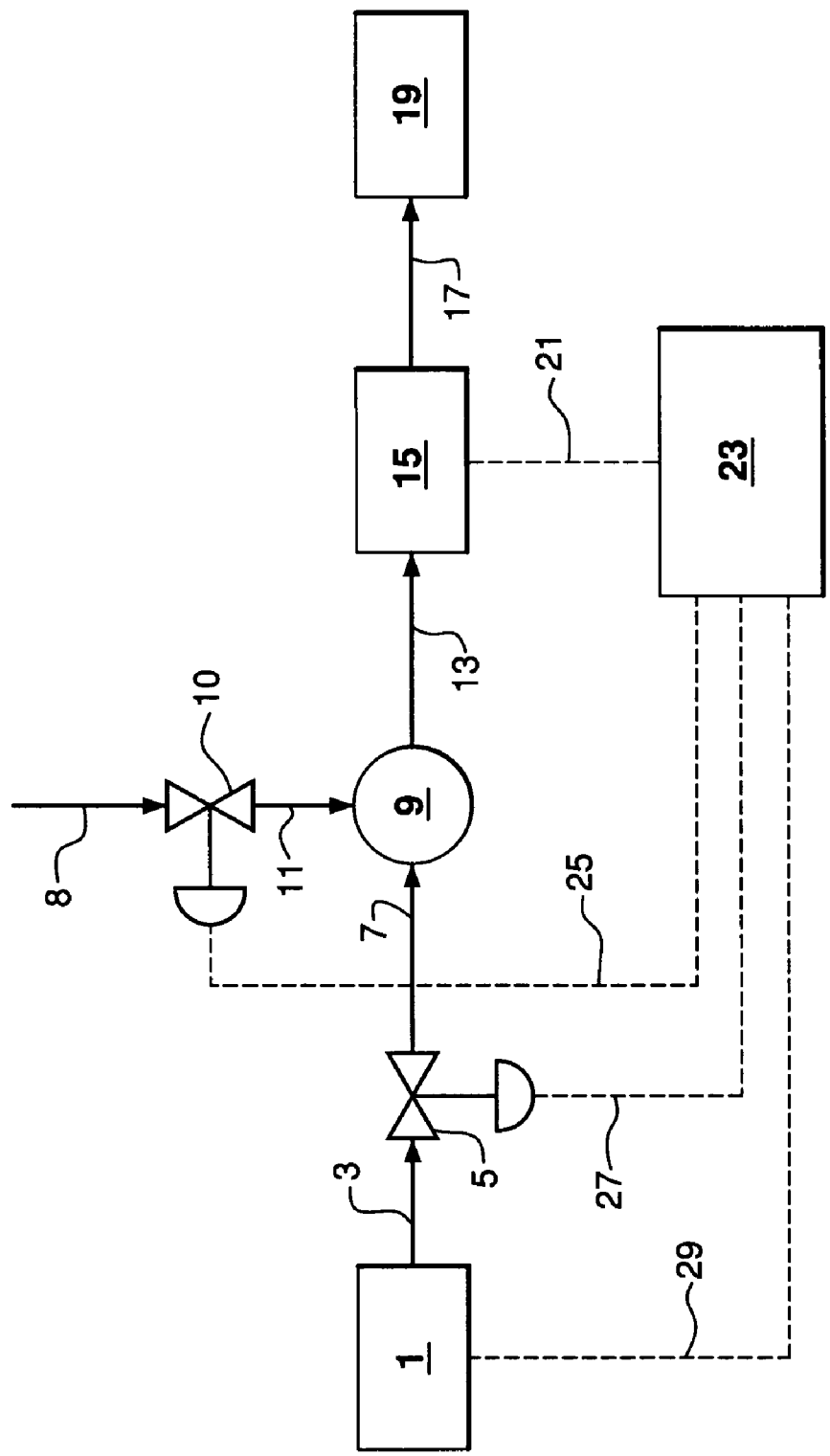
FIG. 1 is a schematic flow diagram of an embodiment of the present invention.

A first embodiment of the invention is illustrated by the process flow diagram of FIG. 1. Primary gas is provided by gas supply system 1 via line 3, flow control valve 5, line 7, and mixing zone 9. A secondary gas (later defined) may be introduced via line 8, control valve 10, and line 11 into mixing zone 9 during certain operating conditions as described later. Gas supply system 1 may be a gas generation system which produces the primary gas onsite or a gas storage system which stores primary gas produced offsite and delivered on a regular basis. Mixing zone 9 may utilize any type of mixing apparatus known in the art to ensure a homogeneous or nearly homogeneous mixed gas in line 13. Mixing apparatus may include, for example, diffusers, diffuser plates, baffles, static mixers, and the like.

Gas from mixing zone 9 flows via line 13 to analytical system or analysis zone 15 which is equipped with an array of one or more sensors to determine continuously the concentrations of one or more impurities in the gas flowing via line 13. Each sensor may be selected to detect a given impurity. A high purity gas product flows via line 17 to product gas receiving system 19, wherein the gas is used or stored for future use. The high purity gas product may contain one or more impurities, and the concentrations of one or more of these impurities may be undesirable in receiving system 19. A maximum allowable concentration is specified for each undesirable impurity present or potentially present in the high purity product gas in line 17. During normal operation, any impurity in the primary gas provided by gas supply system 1 should be below these maximum allowable concentrations. The concentration of any of the undesirable impurities in the secondary gas provided via line 8 should be well below the maximum allowable concentrations in the high purity product gas. Any of the impurity concentrations in the secondary gas may be below detectable limits. The secondary gas may be provided from a storage system that stores the gas as a compressed gas, a cryogenic liquid, an adsorbed gas, or a chemically bound gas. Alternatively, the secondary gas may be hydrogen generated by the hydrolysis of water.

The output signals of the one or more sensors in analytical system or analysis zone 15 are transmitted via signal line 21 to control system 23. The output signal from each impurity sensor is compared by control system 23 with a parameter for the impurity detected by that sensor, wherein the parameter is stored in control system 23 and is proportional to the maximum allowable concentration of that impurity in the high purity product gas in line 17. During normal operation when the concentrations of all undesirable impurities in the high purity product gas are below the maximum allowable concentrations, control system 23 sends a control signal via signal line 25 to maintain control valve 10 in a closed position. Control system 23 maintains a desired flow rate of high purity gas in line 17 by sending a signal via signal line 27 to control valve 5 to maintain the flow rate of the primary gas in line 7 at this desired flow rate.

During abnormal or upset conditions associated with gas supply system 1, the concentrations of one or more impurities in the high purity product gas in line 13 may increase and approach the maximum allowable concentrations. These rising concentrations are detected by the sensors in analytical system 15 and signals proportional to the concentrations are transmitted to control system 23. When any of the detected rising impurity concentrations exceeds the corresponding stored maximum concentration parameters, control system 23 will determine the flow rates of the primary and secondary gases in order to (1) maintain the concentrations of undesirable impurities below the maximum values in the high purity product gas delivered via line 17 and (2) maintain the total desired flow rate of high purity product gas in line 17. The appropriate control signals are transmitted via signal lines 25 and 27 to flow control valves 10 and 5, respectively, and the proper flow rates are controlled in lines 7 and 11.

Under certain upset conditions, the concentration of any of the impurities in the primary gas may increase to elevated levels that indicate serious operating problems with gas supply system 1. This may be observed by monitoring the ratio of the secondary gas flow in line 11 to the primary gas flow in line 7. When this ratio exceeds a predetermined maximum value, control system 23 may take corrective action to (1) generate an alarm to inform local or remote operating personnel and/or (2) transmit a signal via signal line 29 to reduce the production rate of gas supply system 1 or to terminate operation of gas supply system 1. If the operation of gas supply system 1 is terminated, the total flow of high purity product gas via line 13 may be supplied by the secondary gas, and flow control valve 10 therefore should be designed for the required flow rate.

Figure 2:
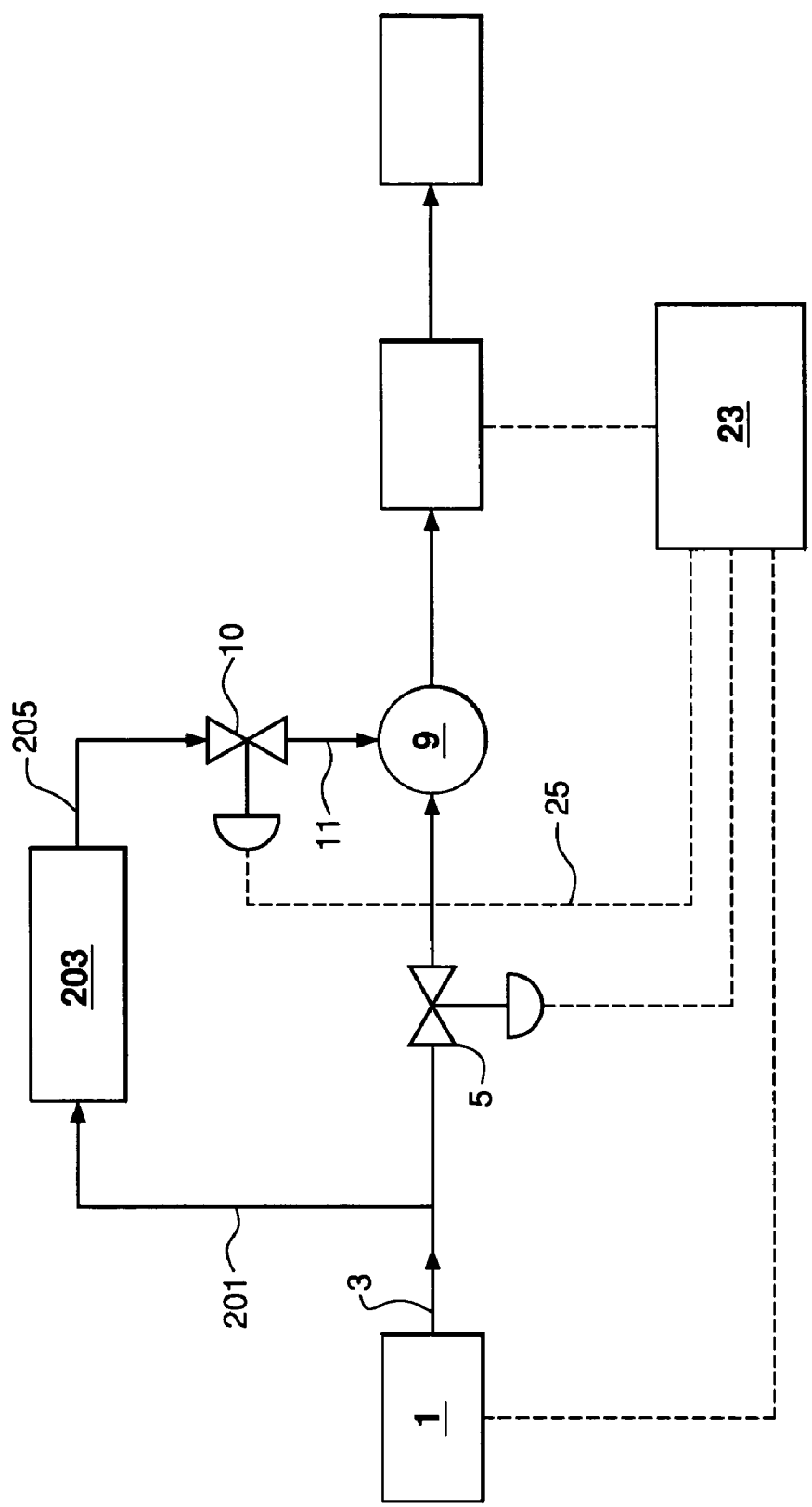
FIG. 2 is a schematic flow diagram of an alternative embodiment of the present invention.

An alternative embodiment of the invention is illustrated in FIG. 2 wherein the secondary gas is provided by purifying a portion of the primary gas. In this embodiment, a portion of the primary gas in line 3 is withdrawn via line 201 to purification system 203, which is designed and adapted to remove any of the impurities that may be present in the primary gas from gas supply system 1. When a purified gas diluent is required as determined by control system 23, control valve 10 receives a control signal via control line 25, thereby initiating flow via line 201 to purification system 203, and purified gas flows via line 205, control valve 10, and line 11 to mixing zone 9. The flow rates of primary gas and secondary gas are controlled via flow control valves 5 and 10 by control system 23 as earlier described. All other features of the embodiment of FIG. 2 are similar to the corresponding features described above with respect to FIG. 1.

Purification system 203 may utilize one or more purification methods adapted to remove the impurities present in the primary gas. These purification methods may be selected from known methods such as, for example, permeation through a hydrogen-permeable membrane, pressure swing adsorption, thermal swing adsorption, and chemical reaction with a porous solid (e.g., a getter).

Figure 3:
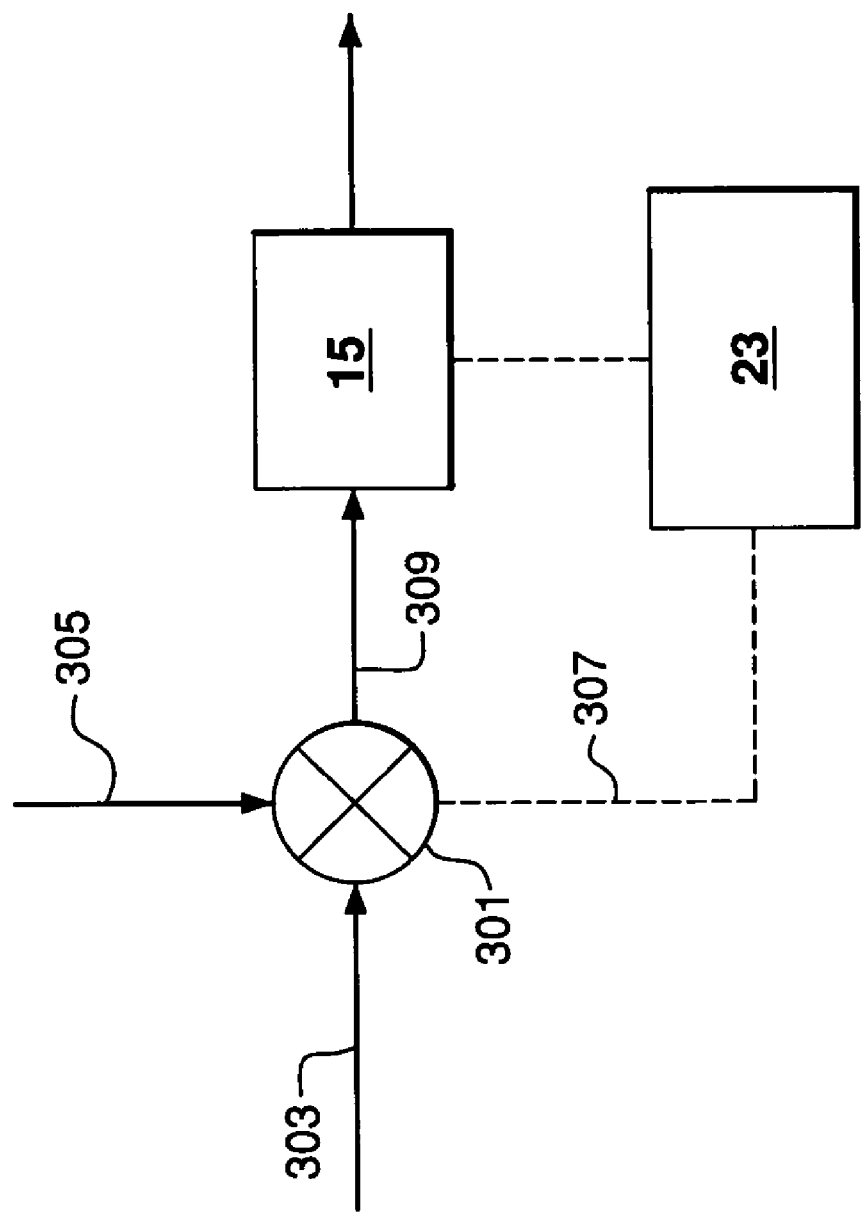
FIG. 3 is a schematic flow diagram of another embodiment of the present invention.

An alternative embodiment is illustrated in FIG. 3 wherein individual flow control valves 5 and 10 are replaced with proportional flow control and mixing valve 301 to control the flow and mix the streams provide the high purity gas product at the proper purity and flow rate via line 309. The primary and secondary gas streams may be provided as in the embodiment of FIG. 1 described above. Primary gas passes via line 303 and secondary gas passes via line 305 to proportional flow control and mixing valve 301, which receives a signal from control system 23 via control line 307. Mixed gas having the proper ratio of primary and secondary gas flows to analytical system 15, which operates in conjunction with control system 23. Analytical system 15 uses at least one sensor adapted to measure the concentration of at least one impurity component in the high purity gas product and generate a first signal proportional to the concentration of the impurity component.

Control system 23 receives the first signal and compares the signal with a first parameter proportional to the concentration of the impurity in the primary gas stream and a second parameter proportional to a maximum allowable concentration of the impurity in the high purity gas product. Control system 23 generates a second signal proportional to the ratio of the first and second parameters and transmits the second signal via control line 307 to proportional flow control and mixing valve 301, which adjusts the flow rates of the primary and secondary gas streams in lines 303 and 305 to yield a concentration of the impurity in the high purity gas product equal to or less than the maximum allowable concentration of that impurity.

Analytical system or analysis zone 15 is an important component in the embodiments described above. This analytical system uses at least one sensor to measure the concentration of an undesirable impurity as described above, and may have an array of multiple sensors for measuring the concentrations of multiple impurities in the high purity product gas. For example, analytical system 15 may include a sensor adapted to detect the concentration of carbon monoxide in the supply stream, a sensor to detect the concentration of carbonyl sulfide, and other sensors for other contaminants. When multiple impurities are analyzed by multiple sensors, control system 23 may take action to adjust flow control valves 5 and 10 (FIGS. 1 and 2) or proportional flow control and mixing valve 301 (FIG. 3) when any of the impurity concentrations approaches and exceeds corresponding allowable maximum concentrations.

Alternatively or additionally, analytical system 15 may be designed to measure the total concentration of all undesirable impurities in the high purity product gas, and control actions may be taken by control system 23 when this total impurity concentration exceeds a predetermined maximum concentration.

Each of the sensors in analytical system or analysis zone 15 should be capable of measuring the concentration of a monitored impurity directly in real time, may have a response time of less than about 2 sec, and may detect impurity concentrations in the range of 0.001 to 1,000 ppmv. The sensors should not require additional reactant gases or reagents and should not generate additional impurities, for example by causing chemical reactions among the components of the gas stream being monitored. Any type of sensors known in the art for this type of service may be used in the embodiments described above. These sensors may be selected from, but are not limited to, field effect transistor (FET) sensors, microcantilever sensors, quartz-crystal sensors, electrolytic sensors, and chemiresistor sensors.

Microcantilever sensors are suitable for measuring species such as carbon monoxide, carbon dioxide, hydrogen sulfide, carbonyl sulfide, and methane. Detection limits in the ppm, ppb and ppt (parts per trillion) by volume are possible have been demonstrated in the art. Microcantilever sensors self-compensate for variations in gas pressure, temperature, and flow rate because two sides of the lever contact the gas; one side is active and the other is a reference. Chemical selectivity in microcantilever sensors can be achieved by using chemically specific coatings on the sensor elements. Microcantilever sensors can be made into arrays for detection of a plurality of impurities. A microcantilever sensor array may be used to measure at least two of carbon monoxide, carbon dioxide, hydrogen sulfide, carbonyl sulfide, and methane in a high purity hydrogen stream.

Chemiresistor sensor technology may be used for the measurement of carbon monoxide, carbon dioxide, hydrogen sulfide, carbonyl sulfide, and methane in hydrogen. A unique sensor composition is required for each of these impurities, and a detection range of approximately 5-40,000 ppmv may be possible with these sensors. Chemiresistor sensors do not require oxygen for their operation, they are particularly rugged and stable, and they maintain their calibrations for suitably long periods of time. Chemiresistor sensors must be pressure compensated and temperature controlled so that cross interference (e.g. between CO and $H_2S$) does not occur, which can slow the sensor response. Chemiresistor gas sensors using semiconductor materials comprising thin film metal oxides, such as tungsten oxide, have shown good sensitivity for detecting reducing gases, such as hydrogen, anhydrous ammonia, hydrazine, propane, butane, methyl alcohol, ethyl alcohol and hydrogen sulfide as disclosed in U.S. Pat. Nos. 5,433,971 and 5,321,146, which are incorporated herein by reference.

Water may be measured by quartz-crystal sensors such as those sold by Ametek® or by electrolytic sensors such as those sold by Meeco, Inc. Detection ranges for quartz-crystal sensors vary, depending on the model, 0.02 ppbv through 2500 ppmv. These sensors are expected to be compatible with virtually all non-corrosive gases including inerts, hydrogen, oxygen, and nitrogen. Electrolytic sensors are expected to be compatible with hydrogen at concentrations up to 5000 ppmv with 1 ppm resolution and at concentrations up to 1000 ppmv with 0.1 ppm resolution.

Oxygen may be measured using electrochemical fuel cell sensors such as those sold by Meeco, Inc. and Teledyne Analytical Instruments, and by coulometric sensors such as those sold by Delta F. These sensors can detect ranges at ppm levels as well as percentage levels, and they are expected to be compatible with hydrogen.

Control system 23 may utilize a programmable logic computer (PLC) or any other type of controller known in the art for this service. An exemplary controller for use with embodiments of the present invention is a Siemens Model 353 standalone electronic controller. Input and output signals to and from the control system may be electronic signals measured in units of current or voltage as is customary in the control system art. Other, non-exclusive signal pathways may include an optical signal, wave form, or other signal that may be received by the control system and readily transduced into a control signal. The communication among analysis system 15, control system 23, and control valves 5, 10, and 301 may be hardwired as shown in FIGS. 1-3, or alternatively may be effected through wireless communication channels.

Gas supply system 1 may be a gas generation system which produces the primary gas onsite or may be a gas storage system which stores primary gas produced offsite and delivered on a regular basis. For example, gas supply system 1 may be a high purity hydrogen generation system in which a feed gas comprising one or more hydrocarbons having up to 5 carbon atoms is converted to synthesis gas by steam reforming, partial oxidation, autothermal reforming, or combinations thereof. The synthesis gas typically is shifted to convert carbon monoxide to carbon dioxide, the carbon dioxide is removed, and the remaining gas is purified by pressure swing adsorption to yield a high purity hydrogen product. The hydrogen may contain at least one impurity component selected from the group consisting of hydrogen sulfide; carbonyl sulfide; carbon monoxide; hydrocarbons having up to 5 carbon atoms; and compounds containing carbon atoms, hydrogen atoms, and one or more atoms selected from the group consisting of oxygen, nitrogen, and sulfur. In one example, the hydrogen product after final purification is greater than 99.988 vol % pure and contains essentially no carbon dioxide, essentially no oxygen, essentially no hydrogen sulfide, less than 8 ppmv water, less than 10 ppmv carbon monoxide, less than 10 ppmv methane, and less than 100 ppmv nitrogen. Alternatively, gas supply system 1 may be a water electrolysis system to generate high purity hydrogen. Other onsite gas production systems may be utilized to provide other primary gases by gas supply system 1 as needed.

In another embodiment, gas supply system 1 may be a storage system which stores primary gas produced offsite and delivered on a regular basis to refill the storage system. For example, the system may be a cryogenic liquid storage system with a vaporizer unit to provide the primary gas. Alternatively, the primary gas may be stored as a high pressure gas in compressed gas cylinders or as a liquid in pressurized cylinders at ambient temperature. Other gas storage methods may be used such as, for example, chemical hydrides, metal hydrides, gas on solid adsorption, and glass microspheres. In one example application, gas supply system 1 may provide high purity hydrogen from evaporated liquid hydrogen or from highly purified gaseous hydrogen stored in cylinders. Industrial-purity liquid hydrogen is generally 99.999% pure, having less than 1 ppmv oxygen, less than 5 ppmv nitrogen, less than 1 ppmv argon, less than 4 ppmv methane, less than 0.5 ppmv carbon monoxide, less than 0.5 ppmv carbon dioxide, and less than 0.5 ppmv water. There are various grades of highly purified gaseous hydrogen, such as VLSI, electronic, research, ultra-pure carrier, UHP/zero, and high purity grades. These highly-purified grades of hydrogen are generally greater than 99.995% pure, having typically less than 2 ppmv argon, less than 0.5 ppmv carbon dioxide, less than 1 ppmv carbon monoxide, less than 0.5 ppmv total hydrocarbons, less than 7 ppmv nitrogen, less than 0.1 ppmv nitrous oxide, less than 5 ppmv oxygen, and less than 4 ppmv water.

Product gas receiving system 19 may be a process which directly consumes the high purity product gas, or alternatively a storage system which stores the product gas for future use. In one application, for example, product gas receiving system 19 is a fuel cell which consumes high purity hydrogen as the high purity product gas provided by a gas supply system of FIGS. 1-3 described earlier. Fuel cell technologies used in this application may include proton exchange membranes (PEM), solid oxide fuel cells (SOFC), alkaline fuel cells, and direct methanol fuel cells (DMFC). Impurity concentration limits in the feed gas to PEM fuel cells may be less than 1 vol % total inert gases (nitrogen, argon, helium), less than 1 part per million by volume (ppmv) total hydrocarbons, less than 500 ppmv oxygen, less than 2 ppmv carbon monoxide plus carbon dioxide, less than 1 ppmv total sulfur-containing compounds (e.g. gaseous sulfur, hydrogen sulfide, and carbonyl sulfide), less than 10 parts per billion by volume (ppbv) ammonia, and less than 5 ppmv water. In this application, the sensors used in analysis system 15 are selected specifically to analyze for these impurities and control action is taken by control system 23 when any impurity concentration exceeds its allowable upper limit.

The systems described above in FIGS. 1-3 may be utilized to provide multiple grades of the gas product in line 17 wherein the impurity concentrations in each stream are stored in control system 23 and the flow rates of the primary and secondary gas streams are adjusted accordingly by control valves 5 and 10 or by flow ratio and mixing valve 303. In one example, the system may be used to provide a hydrogen stream of a higher purity to a first hydrogen fuel cell system in product gas receiving system 19. When a second fuel cell requiring lower purity hydrogen is used in product gas receiving system 19, the operation of the gas supply system can be changed to supply the lower purity hydrogen.

The invention claimed is:

1. A method for supplying a high purity gas product comprising
   (a) providing a first gas stream comprising a major component and at least one impurity component;
   (b) determining the concentration of the at least one impurity component and comparing the concentration so determined with a reference concentration for that component;
   (c) when the value of the concentration so determined is less than or equal to the reference concentration, utilizing the first gas stream to provide the high purity gas product; and
   (d) when the value of the concentration so determined is greater than the reference concentration,
      (1) providing a second gas stream comprising the major component, and
      (2) mixing the first gas stream with the second gas stream to yield a mixed gas stream having a concentration of the at least one impurity component that is less than the reference concentration, and utilizing the mixed gas stream to provide the high purity gas product.

2. The method of claim 1 wherein the major component of the first gas stream is hydrogen.

3. The method of claim 2 wherein the at least one impurity component is selected from the group consisting of hydrogen sulfide; carbonyl sulfide; carbon monoxide; hydrocarbons having up to 5 carbon atoms; and compounds containing carbon atoms, hydrogen atoms, and one or more atoms selected from the group consisting of oxygen, nitrogen, and sulfur.

4. The method of claim 2 wherein the first gas stream is generated from a feed gas comprising one or more hydrocarbons having up to 5 carbon atoms by any of steam reforming, partial oxidation, and autothermal reforming.

5. The method of claim 2 wherein the hydrogen is generated by the electrolysis of water.

6. The method of claim 1 wherein the second gas stream is provided from a storage system that stores the gas as a compressed gas, a cryogenic liquid, an adsorbed gas, or a chemically bound gas.

7. The method of claim 6 wherein the major component of the first gas stream is hydrogen and the major component of the second gas stream is hydrogen.

8. The method of claim 7 wherein the storage system stores the gas as liquid hydrogen and the hydrogen in the second gas stream is provided by vaporizing the liquid hydrogen.

9. The method of claim 1 wherein the major component in the first and second gas streams is hydrogen and either (1) the first gas stream is provided by the electrolysis of water or the second gas stream is provided by the electrolysis of water or (2) the first gas stream is provided by the electrolysis of water and the second gas stream is provided by the electrolysis of water.

10. The method of claim 1 wherein the concentration of the at least one impurity component in the first gas stream is determined by a sensor selected from the group consisting of field effect transistor (FET) sensors, microcantilever sensors, quartz-crystal sensors, electrolytic sensors, and chemiresistor sensors.

11. The method of claim 1 wherein the high purity gas product comprises hydrogen as the major component and wherein the high purity gas product is utilized as feed to a fuel cell.

12. An apparatus for generating a high purity gas product comprising
   (a) a first flow control valve and piping means adapted to provide a first gas stream comprising a major component and at least one impurity component;
   (b) a second control valve and piping means adapted to provide a second gas stream comprising the major component;
   (c) a mixing zone having a first inlet, a second inlet, and an outlet, wherein the first inlet is in gas flow communication with the first flow control valve and piping means and the second inlet is in gas flow communication with the second control valve and piping means, and wherein the mixing zone is adapted to mix the first and second gas streams and provide a mixed gas stream via the outlet;
   (d) an analysis zone having an inlet, an outlet, and at least one sensor adapted to measure the concentration of the at least one impurity component in the mixed gas stream and generate a first signal proportional to the concentration of the impurity component therein, wherein the inlet of the analysis zone is in gas flow communication with the outlet of the mixing zone and the outlet is adapted to provide the high purity gas product; and
   (e) control means adapted to receive the first signal, compare the first signal with a first parameter proportional to the concentration of the at least one impurity in the first gas stream and a second parameter proportional to a maximum allowable concentration of the at least one impurity in the high purity gas product, generate a second signal and a third signal, and transmit the second and third signals to the first and second flow control valves, respectively, such that the flow rates of the first and second gas streams can be adjusted to yield a concentration of the at least one impurity in the high purity gas product equal to or less than the maximum allowable concentration.

13. The apparatus of claim 12 wherein the first gas stream comprises a plurality of impurity components and the analysis zone comprises a plurality of sensors, wherein each sensor is adapted to determine the concentration of a different impurity component.

14. The apparatus of claim 12 which further comprises means for generating the first gas mixture from a feed gas comprising one or more hydrocarbons having up to 5 carbon atoms by any of steam reforming, partial oxidation, and autothermal reforming.

15. The apparatus of claim 12 which further comprises either (1) means to provide the first gas stream by the electrolysis of water or means to provide the second gas stream by the electrolysis of water or (2) means to provide the first gas stream by the electrolysis of water and means to provide the second gas stream by the electrolysis of water.

16. A method for generating a high purity gas product comprising
  (a) providing an apparatus comprising
    (1) a first flow control valve and piping means and adapted to provide a first gas stream comprising a major component and at least one impurity component;
    (2) a second control valve and piping means adapted to provide a second gas stream comprising the major component;
    (3) a mixing zone having a first inlet, a second inlet, and an outlet, wherein the first inlet is in gas flow communication with the first flow control valve and piping means and the second inlet is in gas flow communication with the second control valve and piping means, and wherein the mixing zone is adapted to mix the first and second gas streams and provide a mixed gas stream via the outlet;
    (4) an analysis zone having an inlet, an outlet, and at least one sensor adapted to measure the concentration of the at least one impurity component in the mixed gas stream and generate a first signal proportional to the concentration of the impurity component therein, wherein the inlet of the analysis zone is in gas flow communication with the outlet of the mixing zone and the outlet is adapted to provide the high purity gas product; and
    (5) control means adapted to receive the first signal, compare the first signal with a first parameter proportional to the concentration of the at least one impurity in the first gas stream and a second parameter proportional to a maximum allowable concentration of the at least one impurity in the high purity gas product, generate a second signal and a third signal, and transmit the second and third signals to the first and second flow control valves, respectively;
  (b) providing the first gas stream comprising the major component and the at least one impurity component;
  (c) determining the concentration of the at least one impurity component in the mixed gas stream, generating the first signal proportional to the concentration of the impurity component therein, and comparing the first signal so generated with the first and second parameters;
  (d) when the value of the first signal so determined is less than or equal to the second parameter, generating the second and third signals which open the first control valve and close the second control valve, respectively, such that the first gas stream provides the high purity gas product; and
  (e) when the value of the first signal so determined is greater than the second parameter,
    (1) generating the second and third signals,
    (2) providing the second gas stream comprising the major component,
    (3) utilizing the second and third signals to control the first and second flow control valves, respectively, such that the signal proportional to the concentration of the at least one impurity component in the mixed gas stream is less than the second parameter, and
    (4) utilizing the mixed gas stream to provide the high purity gas product.

17. The method of claim 16 wherein the first gas stream comprises a plurality of impurity components and the analysis zone comprises a plurality of sensors, wherein each sensor is adapted to determine the concentration of a different impurity component.

18. The method of claim 16 which further comprises generating the first gas mixture from a feed gas comprising one or more hydrocarbons having up to 5 carbon atoms by any of steam reforming, partial oxidation, and autothermal reforming.

19. The method of claim 16 wherein the first gas stream comprises hydrogen generated by the electrolysis of water.

20. A method for supplying a high purity gas product comprising
  (a) providing a first gas stream comprising a major component and at a plurality of impurity components;
  (b) determining the concentration of each of the impurity components and summing the concentrations so determined to yield a total impurity concentration, and comparing the total impurity concentration with a reference total impurity concentration;
  (c) when the value of the total impurity concentration is less than or equal to the reference total impurity concentration, utilizing the first gas stream to provide the high purity gas product; and
  (d) when the value of the total impurity concentration is greater than the reference total impurity concentration,
    (1) providing a second gas stream comprising the major component, and
    (2) mixing the first gas stream with the second gas stream to yield a mixed gas stream having a total impurity concentration that is less than the reference total impurity concentration, and utilizing the mixed gas stream to provide the high purity gas product.

* * * * *